Figure 1:
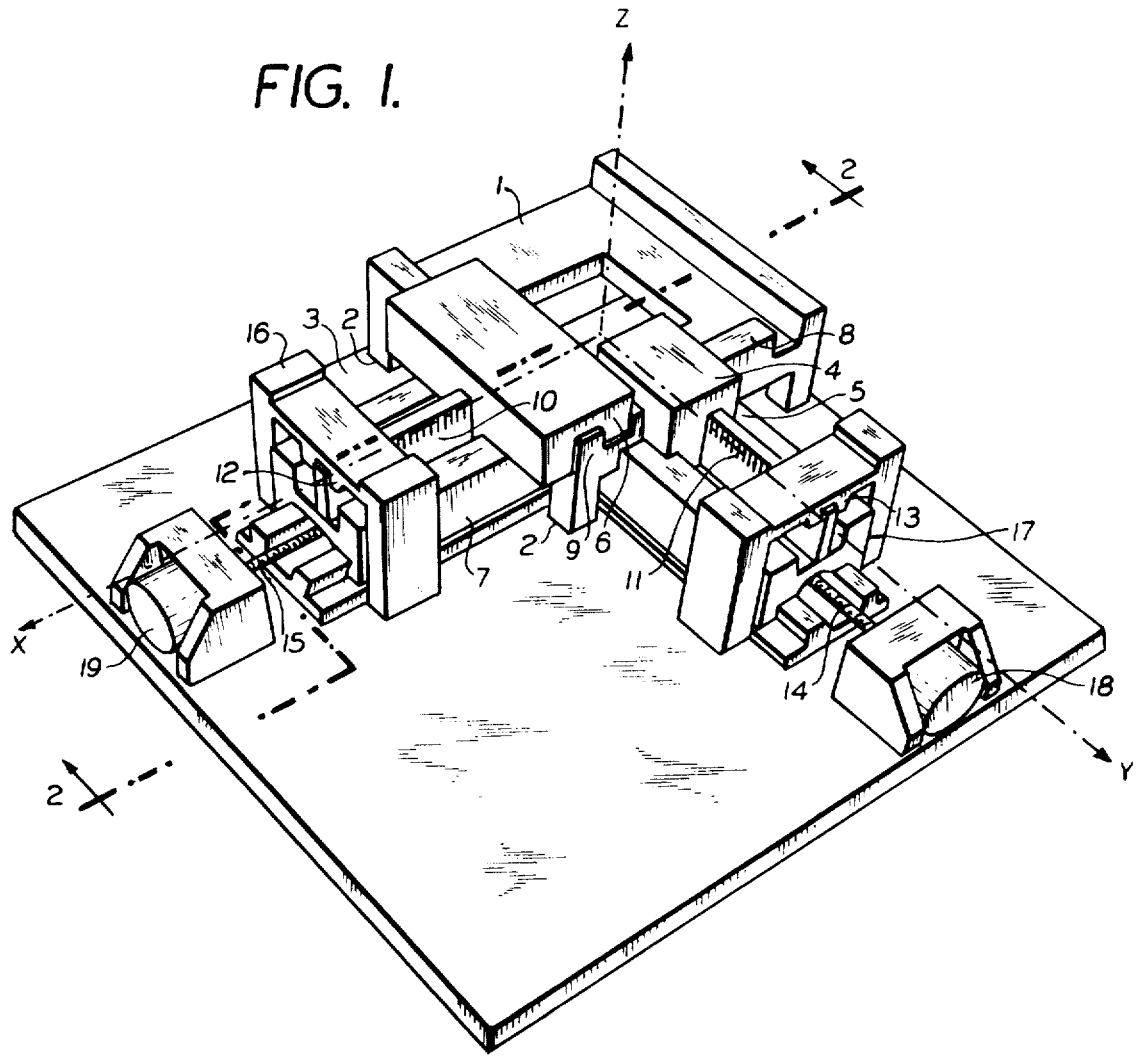

United States Patent
Ernst et al.

[15] 3,675,331
[45] July 11, 1972

[54] APPARATUS FOR THE MEASURABLE DISPLACEMENT OF AN OBJECT

[72] Inventors: Alfons Ernst, Traunreut; Rudolf Hofling, Gauting, both of Germany

[73] Assignee: Dr. Johannes Heidenhain, Traunstein, Germany

[22] Filed: July 30, 1969

[21] Appl. No.: 846,137

[30] Foreign Application Priority Data

July 14, 1969 Germany ..................... P 19 11 908.5

[52] U.S. Cl. ............................... 33/1 M, 33/125 C, 33/189
[51] Int. Cl. ........................................................ G01b 21/20
[58] Field of Search ...................... 33/1 M, 125 C, 189, 191

[56] References Cited

UNITED STATES PATENTS

| | | | |
|---|---|---|---|
| 3,001,081 | 9/1961 | Bower | 33/125 CX |
| 3,024,396 | 3/1962 | Peckjian | 33/1 M |
| 3,137,942 | 6/1964 | Powers et al. | 33/1 M |
| 3,495,519 | 2/1970 | Alfsen et al. | 33/1 M X |

*Primary Examiner*—William D. Martin, Jr.
*Attorney*—Ernest G. Montague

[57] ABSTRACT

An apparatus for measurable displacement of an object in a plurality of coordinates by means of guide systems, which comprises an object carrier which is measurably displaceable. Guiding systems for the object carrier are separated from each other. Measuring systems are coordinated to the guiding systems and defining axes, and the working point is disposed on the object always in the section of the axes.

16 Claims, 2 Drawing Figures

PATENTED JUL 11 1972 3,675,331

INVENTORS
ALFONS ERNST
RUDOLF HÖFLING

BY

ATTORNEY

APPARATUS FOR THE MEASURABLE DISPLACEMENT OF AN OBJECT

The present invention relates to an apparatus for the measurable displacement of an object in general, and to such apparatus for the measurable displacement of an object in a plurality of coordinates by means of guiding systems.

In known devices of this type, one of the guiding systems for the X-axis and Y-axis is the carrier of the other guiding system, on which the object is provided, which is measurably settable by means of measuring systems coordinated to the guiding systems.

Devices of this type are not suitable for highly exact workings, because measuring errors of the first order can occur thereby.

It is one object of the present invention, to provide an apparatus for the measurable displacement of an object, wherein the drawbacks of known devices with overlapping guiding systems are eliminated and a highly exact, as well as a many fold applicable apparatus of the mentioned type is created with simple means.

It is another object of the present invention to provide an apparatus for the measurable displacement of an object in a plurality of coordinates by means of guiding systems, wherein the guiding systems for the measurably displaceable object carrier are separated from each other and arranged such, that the working point on the object is disposed always in the crossing of the axes of the measuring systems coordinated to the guiding systems.

By the arrangement, in accordance with the present invention, to dispose the working point always in the crossing of the two axes of the measuring systems, the measuring in accordance with the Abbé-principle is made possible. Since in the apparatus of the present invention the measuring systems and their measuring divisions, respectively, are moved solely in their measuring axis, the crossing point of the axes remains in each working position of the object at the same point, namely in the working point. In accordance with the present invention, also the face and gravity center points of the guiding systems for the object carrier are disposed also in the measuring axes X and Y, disposed perpendicularly towards each other.

Figure 2:
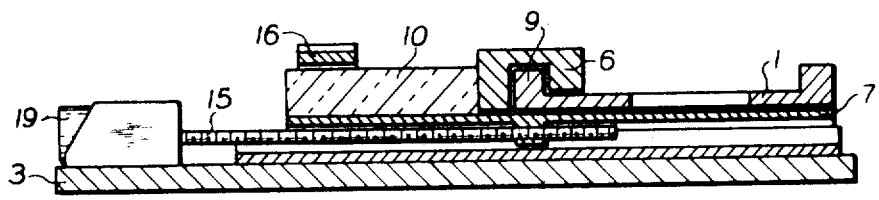

With these and other objects in view, which will become apparent in the following detailed description, the present invention, which is shown by example only, will be clearly understood in connection with the accompanying drawings, in which:

FIG. 1 is a perspective view of the apparatus designed in accordance with the present invention; and FIG. 2 is a section along the lines 2—2 of FIG. 1.

Referring now to the drawings, the apparatus designed in accordance with the present invention serves the exact movement of an object, by example of a mask or the like, into axes X and Y, which are disposed perpendicular to each other, and which are arranged in a horizontal plane. The object, which is not shown in the drawings, is suitably mounted by means of a three-point engagement on an object carrier 1, which can be, for example, a measuring table.

For the guidance of the object carrier 1 are provided, in accordance with the present invention, two guiding systems 4 and 6, which are of equal range, and which guiding systems 4 and 6 are strictly separated from each other. By this particular arrangement of the guiding systems 4 and 6 for the object carrier 1 it is brought about, that the working point on the object is disposed always in the crossing point of the axes x and Y.

The guiding systems 4 and 6 for the object carrier are measurably displaceable in auxiliary guides 5 and 7, which are secured separate from each other on a plane base plate 3, preferably made of hard granite. The guidance of the object carriers 1 in the measuring plane takes place in the embodiment shown by example by four supporting bearings of a known type disposed in projections 2, which are on the base plate 3.

An exact guidance of the object carrier 1 in the coordinates X and Y is obtained by known aerostatic precision bearings, which are arranged in the guiding systems 4 and 6. In a possible embodiment two plane parallel plane ledges 8 and 9 are mounted which are disposed at a right angle relative to each other. These two ledges 8 and 9 which are rigidly connected with the object carrier 1, are guided in the air pillows at the fork-like guiding systems 4 and 6. In the embodiment shown by example, the guiding system 6 is in the direction crosswise to the X-axis of about the double length as that of the guiding system 4 in a direction crosswise to the Y-axis. By this long guiding system 6 also the angular position of the object carrier 1 relative to the Z-axis is determined.

The auxiliary guides 5 and 7 and their slides, respectively, are also carriers of the measuring divisions 10 and 11, which are rigidly secured to the slide and are sensed by sensing heads 12 and 13, by example of a photoelectric grid sensing device of known structure. The sensing devices 12 and 13, the grid sensing plate of which supports itself suitably by means of aerostatic bearings on the division plane of the measuring division 10 and 11, are provided in bridges 16 and 17, which are secured to the base plate 3.

The electrical signals emitted from the sensing devices 12 and 13 control, in a known manner, an electronic direction discriminator-counter circuit.

The slides of the auxiliary guides 5 and 7, which can also be mounted aerostatically, are provided for the drive and for the measuring of the object carrier 1 in the axes X and Y. The drive of the slides of the auxiliary guides 5 and 7 takes place by means of threaded spindles 14 and 15, which are coupled with driving motors 18 and 19, respectively.

In the embodiment shown by example in the drawing, in a manner not shown in the drawing, on a bridge above the object carrier, an observation member for the object is provided, for example, a microscope. This bridge is suitably rigidly connected with the carrier bodies 16 and 17 for the sensing devices 12 and 13. The bridge carrying the observation or working member is swingable for an easy insertion of the object.

While I have disclosed one embodiment of the present invention, it is to be understood that this embodiment is given by example only, and not in a limiting sense.

We claim:

1. An apparatus for measurable displacement of an object in a plurality of coordinates by means of guide systems, comprising a measurably displaceable object carrier adapted to carry an object thereon, at least two guiding system means separated from each other for respectively guiding said object carrier, the latter operatively connected to said guiding system means, respectively, a measuring system means coupled to each of said guiding system means, respectively, and each defining a measuring axis, respectively, each of said measuring system means for indicating a displacement movement of its corresponding guiding system means and of said object carrier, each of said measuring system means including guiding means for moving said each of said measuring system means exclusively in its measuring axis, whereby each working point on said object always being disposed in the crossing point of said measuring axes of said measuring system means.

2. The apparatus, as set forth in claim 1, wherein said guiding system means have face-and gravity-center points which are disposed exactly in said axes of said measuring system means, respectively.

3. The apparatus, as set forth in claim 1, wherein said measuring system means include auxiliary guides, respectively, and said guiding system means are measurably displaceably disposed on said object carrier in said auxiliary guides, respectively.

4. The apparatus, as set forth in claim 1, which includes
a base plate supporting bearings,
said object carrier supports itself by means of said bearings on said base plate for guidance in a working plane.

5. The apparatus, as set forth in claim 1, wherein
said object carrier includes parts, disposed at a right angle relative to each other, and
said guiding system means surround fork-like said parts respectively of said object carrier.

6. The apparatus, as set forth in claim 5, wherein
said parts include plane parallel ledges mounted on said object carrier,
said guiding system means are formed fork-like, and
said ledges being disposed at a right angle relative to each other and are surrounded by said fork-like guiding system means.

7. The apparatus, as set forth in claim 1, wherein
one of said guiding system means for an X-axis or Y-axis has a length crosswise to the direction of said X- or Y-axis, such that also the angle position of said object carrier relative to a Z-axis is determined.

8. The apparatus, as set forth in claim 7, wherein
said one of said guiding system means is approximately double the length as that of another of said guiding system means for said object carrier.

9. The apparatus, as set forth in claim 3, wherein
said guiding system means for said object carrier include precision bearings operatively coupling said guiding system means to said object carrier,
additional precision bearings for said auxiliary guides,
a base plate, and
aerostatic precision bearing means for supporting said object carrier on said base plate.

10. The apparatus, as set forth in claim 9, wherein
said object carrier has projections, in which said aerostatic supporting bearings are disposed.

11. The apparatus, as set forth in claim 3, further comprising
a base plate,
bridges mounted on said base plate,
measuring divisions are disposed on said auxiliary guides, and said measuring system means include sensing means which are operatively arranged on said base plate by means of said bridges, respectively.

12. The apparatus, as set forth in claim 11, wherein
said measuring system means comprise photoelectric grid sensing means including a grid division, and
the latter is displaced in a measuring axis X and Y only.

13. The apparatus, as set forth in claim 12, which includes
a bridge disposed over said object carrier,
an observation means for said object provided on said bridge,
said bridge supporting itself on said base plate and is directly mechanically connected for a stiffening as well as for reduction of setting errors with said bridges for said sensing devices of said measuring system means.

14. The apparatus, as set forth in claim 13, which includes
a holder for said object, and said holder supports itself by means of a three point engagement on said object carrier.

15. The apparatus, as set forth in claim 13 which includes
a drive means for said measurably displaceable object carrier operatively engaging said measuring system means.

16. The apparatus, as set forth in claim 15, wherein
said base plate supporting said object carrier and said auxiliary guides comprises a plate of hard granite.

* * * * *